United States Patent Office 2,939,766
Patented June 7, 1960

2,939,766
METHOD OF PRODUCING HYDROGEN FLUORIDE

John W. Churchill, Kenmore, N.Y., assignor to Olin Mathieson Chemical Corporation, a corporation of Virginia No Drawing. Filed July 1, 1957, Ser. No. 668,931

2 Claims. (Cl. 23—153)

This invention relates to a method for the recovery of hydrogen fluoride from a mixture which consists essentially of an alkali metal bifluoride and hydrogen fluoride-water azeotrope in approximately the same molecular proportions. The mixture can also contain hydrogen fluoride as an optional ingredient.

In the preparation of fluorobenzene by the diazotization of aniline and subsequent decomposition of the benzene diazonium fluoride in the presence of excess anhydrous hydrogen fluoride, the overall equation may be expressed as follows where sodium nitrite is the alkali metal nitrite used:

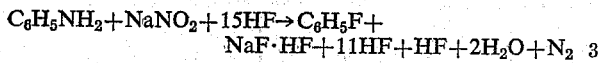

$$C_6H_5NH_2+NaNO_2+15HF \rightarrow C_6H_5F+ NaF\cdot HF+11HF+HF+2H_2O+N_2$$

For this process to be operated in an economical manner, the hydrogen fluoride including free hydrogen fluoride and potential hydrogen fluoride in the form of alkali metal bifluoride and hydrogen fluoride-water azeotrope, consisting of approximately 2 moles of water and 1 mole of HF, must be largely recovered from the reaction mixture. In the preceding equation, it is not critical that 15 molecular proportions of hydrogen fluoride be utilized. Larger amounts can be employed, for example, up to 29 or 30 molecular proportions or even more, depending upon economic factors. The free hydrogen fluoride can be largely recovered from the reaction by distillation. The remaining alkali metal bifluoride and hydrogen fluoride-water azeotrope must also be converted to free hydrogen fluoride.

This is accomplished in accordance with the present invention by admixing the reaction mixture as such following the decomposition of the benzene diazonium fluoride, or that portion of the reaction mixture remaining after removal by distillation of a portion or all of the free hydrogen fluoride, with approximately two molecular proportions of sulfur trioxide. When this is done, approximately 3 moles of free hydrogen fluoride, approximately 1 mole of alkali metal acid sulfate and approximately 1 mole of sulfuric acid are formed, probably as shown by the following overall equation for the case where the diazotization is performed with sodium nitrite:

$$NaF\cdot HF+HF+2H_2O+2SO_3 \rightarrow NaF\cdot HF+ 2H_2SO_4+HF \rightarrow 3HF+NaHSO_4+H_2SO_4$$

Thus, the process probably results in the in situ formation of sulfuric acid which subsequently converts sodium bifluoride to hydrogen fluoride and alkali metal acid sulfate. After this has been done, the free hydrogen fluoride formed as a result of the reaction can be recovered from the reaction mixture by simple distillation. It will be noted that the use of the sulfur trioxide in the process is particularly advantageous in that the sulfur trioxide not only breaks the undesirable hydrogen fluoride-water azeotrope, but also produces sulfuric acid which can free the hydrogen fluoride present in the alkali metal bifluoride and also convert the alkali metal fluoride present in the alkali metal bifluoride to hydrogen fluoride.

Example I which follows sets forth a typical experiment for the preparation of fluorobenzene by the diazotization of aniline. The remaining examples illustrate various embodiments which fall within the scope of the present invention. In all of the examples, the term "moles" signifies gram moles.

EXAMPLE I

An experiment was conducted by placing 93 grams (1.0 mole) of aniline in a 3-necked copper flask which was provided with means for the addition of hydrogen fluoride, a stirrer and a copper reflux condenser. The flask was placed in an acetone bath and cold methanol was circulated through the condenser. The aniline was stirred and cooled to $-20°$ C. by the addition of solid carbon dioxide to the acetone bath. Then 15 moles of anhydrous hydrogen fluoride was introduced into the flask, the rate of introduction being such that the temperature in the flask did not exceed $0°$ C. After the addition of the hydrogen fluoride had been completed, the neck of the flask through which the hydrogen fluoride was introduced was plugged with a rubber stopper. Solid sodium nitrite (76.0 grams, 1.1 moles) was then added in increments over a 15-minute period by removing the rubber stopper. During the addition, the temperature of the mixture in the flask was maintained at $0°$ C. to $5°$ C. by the addition of solid carbon dioxide to the acetone bath whenever necessary. After all the sodium nitrite had been added, stirring was continued at $0°$ C. for an additional 30 minutes to insure complete diazotization.

The decomposition of the diazonium salt was carried out by replacing the acetone bath with a heated water bath and heating the reaction mixture to $40°$ C. The extent of decomposition was followed by measuring the amount of nitrogen evolved. By maintaining the temperature at $40°$ C. to $45°$ C., the decomposition was completed in approximately one hour. The fluorobenzene layer was separated. The remaining mixture consisted essentially of 1 mole of sodium bifluoride, 11 moles of hydrogen fluoride and 1 mole of hydrogen fluoride water azeotrope.

EXAMPLE II

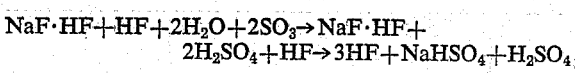

330 grams (16.5 moles) of anhydrous hydrogen fluoride, 84 grams (1.5 moles) of hydrogen fluoride-water azeotrope, and 93 grams (1.5 moles) of sodium bifluoride were charged to a reactor. Liquid sulfur trioxide (216 grams, 2.7 moles) was added dropwise to the reactor over a period of 75 minutes while the contents of the reactor were maintained at from $0°$ C. to $20°$ C. When the addition of the sulfur trioxide was completed, the reaction mixture was permitted to warm to room temperature and then it was heated to distill off hydrogen fluoride. The temperature of the reaction mixture was gradually increased to $141°$ C. and the distillate was collected in two polyethylene bottles placed in series. The distillation was conducted over a period of 170 minutes. The portions of distillate collected were weighed and analyzed for hydrogen fluoride and sulfate ions. 396 grams of distillate was collected containing 395 grams of hydrogen fluoride. No sulfate ions were found in the distillate.

Table I sets forth the experimental conditions and results obtained in a series of similar experiments.

Table I

| Example No. and Composition | Wt. (g.) | Moles | Sulfur Trioxide Addition | | | Distillation | | HF (g.) in Distillate | Wt. (g.) Theor. HF | Percent Recovery HF | Sulfate Ion Distillate |
|---|---|---|---|---|---|---|---|---|---|---|---|
| | | | Moles | Addition Time (min.) | Reaction Temp., °C. | Max. Pot. T., °C. | Time (min.) | | | | |
| (2) | | | | | | | | | | | |
| HF (anhy.) | 220 | 11.0 | 2.0 | 70 | 20-40 | 190 | 120 | 271 | 280 | 96.5 | Positive. |
| NaF.HF | 62 | 1.0 | | | | | | | | | |
| HF.2H$_2$O | 56 | 1.0 | | | | | | | | | |
| (3) | | | | | | | | | | | |
| HF (anhy.) | 220 | 11.0 | 2.0 | 45 | 0-20 | 180 | 240 | 264 | 280 | 94.5 | Trace. |
| NaF.HF | 62 | 1.0 | | | | | | | | | |
| HF.2H$_2$O | 56 | 1.0 | | | | | | | | | |
| (4) | | | | | | | | | | | |
| HF (anhy.) | 216 | 10.8 | 2.0 | 45 | 0-20 | 170 | 225 | 264 | 276 | 96.0 | Trace. |
| NaF.HF | 62 | 1.0 | | | | | | | | | |
| HF.2H$_2$O | 56 | 1.0 | | | | | | | | | |
| (5) | | | | | | | | | | | |
| HF (anhy.) | 228 | 11.4 | 2.0 | 25 | 0-20 | 164 | 145 | 279 | 289.5 | 96.5 | Trace. |
| NaF.HF | 62 | 1.0 | | | | | | | | | |
| HF.2H$_2$O | 56 | 1.0 | | | | | | | | | |
| (6) | | | | | | | | | | | |
| HF (anhy.) | 240 | 12.0 | 2.0 | 50 | 0-20 | 195 | 205 | 269 | 300 | 89.8 | Neg. |
| NaF.HF | 62 | 1.0 | | | | | | | | | |
| HF.2H$_2$O | 56 | 1.0 | | | | | | | | | |
| (7) | | | | | | | | | | | |
| HF (anhy.) | 220 | 11.0 | 2.0 | 65 | 0-20 | 136 | 245 | 261 | 281 | 93.2 | Neg. |
| NaF.HF | 62 | 1.0 | | | | | | | | | |
| HF.2H$_2$O | 56 | 1.0 | | | | | | | | | |
| (8) | | | | | | | | | | | |
| HF (anhy.) | 330 | 16.5 | 3.0 | 88 | 0-20 | 142 | 115 | 390 | 420 | 92.8 | Neg. |
| NaF.HF | 93 | 1.5 | | | | | | | | | |
| HF.2H$_2$O | 84 | 1.5 | | | | | | | | | |
| (9) | | | | | | | | | | | |
| HF (anhy.) | 330 | 16.5 | 2.7 | 55 | 0-20 | 139 | 185 | 394 | 420 | 94.0 | Neg. |
| NaF.HF | 93 | 1.5 | | | | | | | | | |
| HF.2H$_2$O | 84 | 1.5 | | | | | | | | | |

EXAMPLES X-XII

These examples were conducted using mixtures of sodium bifluoride and 50 weight percent aqueous hydrogen fluoride in the making of exploratory studies. They were carried out in a manner similar to that used in Example I, and the addition of the sulfur trioxide to the sodium bifluoride-aqueous hydrogen fluoride mixture was made in 1–2 mm. increments. The addition of the sulfur trioxide produced an instantaneous rise in temperature and this was followed by a rapid cooling. After the sulfur trioxide had been added, the reaction mixture was distilled in order to recover the hydrogen fluoride. In Examples X and XII the test for sulfate ion in the distillate was negative, and in Example XI the distillate contained a trace of sulfate.

Table II sets forth further information concerning the manner in which the various examples were carried out, and the experimental results.

Example XI was conducted to determine whether or not the hydrogen fluoride taken overhead was anhydrous. In this example, the hydrogen fluoride distilled was collected in a trap which contained aniline. The aniline-hydrogen fluoride mixture was analyzed for water content by Karl Fischer methods. The hydrogen fluoride contained 0.26 weight percent water.

Table II

| Example No. and Composition | Wt. (g.) | Moles | Moles HF | Moles H$_2$O | Moles | Addition Time (min.) | Reaction Temp., °C. | Max. Pot. T., °C. | Time (min.) | Wt. (g) Distillate | HF Wt. (g.) in Distillate | Percent Recovery HF |
|---|---|---|---|---|---|---|---|---|---|---|---|---|
| (10) | | | | | | | | | | | | |
| NaF.HF | 124 | 2.0 | | | | | | | | | | |
| 50 pct. HF | 80 | | 2.0 | 2.2 | 2.2 | 70 | 30-50 | 140 | 60 | 110 | 110.5 | 92.0 |
| (11) | | | | | | | | | | | | |
| HF.2H$_2$O: | | | | | | | | | | | | |
| 50 pct. HF | 46 | | 1.15 | 1.28 | | | | | | | | |
| H$_2$O | 18.5 | | | 1.03 | 2.4 | 60 | 30-60 | 160 | 60 | $^1$20 | 19.7 | 87.0 |
| (12) | | | | | | | | | | | | |
| HF.2H$_2$O: | | | | | | | | | | | | |
| NaF.HF | 35.6 | 0.57 | | | | | | | | | | |
| 50 pct. HF | 48 | | 1.2 | 1.33 | | | | | | | | |
| H$_2$O | 19 | | | 1.05 | 2.4 | 45 | 30-70 | 150 | 45 | 40 | 39.8 | 85.0 |

$^1$ The 20.0 g. distillate collected in 309 g. aniline. A heavy orange precipitate occurred which analyzed 6.0 percent HF, 0.26 percent H$_2$O. Analysis of the distillation residue (231 g.) indicated 4.4 g. HF present. No attempt was undertaken to effect complete distillation of the HF.

As described in Cross Patent No. 2,581,174, fluorobenzene can be employed in the manufacture of insecticides by reaction with trichloroacetaldehyde.

It is claimed:

1. A method for the recovery of hydrogen fluoride from a mixture which consists essentially of one molecular proportion of alkali metal bifluoride, approximately one molecular proportion of hydrogen fluoride-water azeotrope and up to twenty-five molecular proportions of hydrogen fluoride which includes the steps of admixing said mixture with approximately two molecular proportions of sulfur trioxide and thereafter distilling the reaction mixture to recover hydrogen fluoride therefrom.

2. The method of claim 1 wherein the alkali metal bifluoride is sodium bifluoride.

References Cited in the file of this patent

UNITED STATES PATENTS

| | | |
|---|---|---|
| 1,960,347 | Osswald | May 29, 1934 |
| 2,021,936 | Johnstone | Nov. 26, 1935 |
| 2,661,266 | Friden et al. | Dec. 1, 1953 |
| 2,661,319 | Shire | Dec. 1, 1953 |

OTHER REFERENCES

H. E. Roscoe and C. Schorlemmer: "A Treatise on Chemistry," vol. I, The Non-Metallic Elements, 3rd edition, 1905, The Macmillan Company, New York, N.Y., page 168.